March 27, 1956  C. T. A. JONES  2,739,867
STATISTICAL MACHINES
Filed Nov. 19, 1953  3 Sheets-Sheet 1

Inventor
CHARLES THOMAS ARTHUR JONES
By

March 27, 1956 C. T. A. JONES 2,739,867
STATISTICAL MACHINES

Filed Nov. 19, 1953 3 Sheets-Sheet 2

Inventor
CHARLES THOMAS ARTHUR JONES

March 27, 1956  C. T. A. JONES  2,739,867
STATISTICAL MACHINES

Filed Nov. 19, 1953  3 Sheets-Sheet 3

Inventor
CHARLES THOMAS ARTHUR JONES
By

United States Patent Office 2,739,867
Patented Mar. 27, 1956

2,739,867
STATISTICAL MACHINES

Charles Thomas Arthur Jones, Wallington, England, assignor to Powers-Samas Accounting Machines Limited, London, England, a British company Application November 19, 1953, Serial No. 393,119

Claims priority, application Great Britain November 27, 1952

6 Claims. (Cl. 346—146)

This invention relates to statistical machines of the kind in which data is recorded under control of actuating members operated by impulses received from the transmission elements of a connection box, the transmission elements of which are actuated by operating members responsive to the sensing of data from a record.

As is well understood in the art, a record which is employed to control a machine of the kind above mentioned may consist of a record card or it may be a tape and the term "record" when used herein is deemed to include any form of record device which may be employed to control the operation of a statistical machine.

In some kinds of statistical machines, for example a machine in which printing is effected under control of records fed to the machine, there is provided between the recording means and the sensing apparatus for sensing data from a record a device known in the art as a connection box, such box including transmission elements to transmit sensed data to the recording means. In some instances, data sensed from a record is to be recorded in the columnar order in which it is sensed from a record, while in other instances the columnar order of recording is to be different from that of sensing. To meet these requirements it is usual for a connection box to be provided for each class of work, the boxes being interchangeable in the machine with which they are to co-operate. It will, however, be understood that the boxes cannot be interchanged during the operation of the machine without interrupting the operation of the machine and if both classes of work are to be performed it has, heretofore, been necessary to complete one class before commencing the second, thus requiring that the records be fed at least twice through the machine. For convenience herein the term "straight wiring" will be employed to identify the transmission elements of a connection box by which recording is effected in the columnar order of sensing and the term "cross wiring" will be employed to identify the transmission elements of a connection box by which recording is effected in a columnar order different from that of sensing.

It is an object of the present invention to provide means whereby there may be employed in a statistical machine a duplex connection box including both "straight wiring" and "cross wiring," selection of the particular wiring for use at any given time being controlled by the records passing through the machine. One example of the use of such a duplex box is when one record to be sensed comprises a four-line name and address requiring cross wiring and the succeeding records to be sensed contain "items" requiring the use of straight wiring.

In order that the invention may be clearly understood one embodiment thereof will now be described, by way of example, with reference to the accompanying diagrammatic drawings in which.

In the following description it is assumed that the statistical machine in which the apparatus according to the present invention is embodied is a machine in which a printed record is effected of data sensed from perforated record cards passed in succession through the machine. The printed records to be produced are statements comprising a heading consisting of a four-line name and address all sensed from a single card followed by a succession of lines of "item" entries each of which is sensed from a separate record card fed through the machine in succession to the card containing the name and address. As is customary, the numerical and alphabetic data is recorded on the cards by perforations formed in vertical columns on the cards, each vertical column containing twelve data-indicating positions. In order to transmit the four-line name and address from the record card to the printing mechanism there must be employed a connection box using cross wiring whereas the transmission of the "item" sensing is to be effected by straight wiring. The means for sensing the record cards is assumed to be of the well known kind which consists of axially movable sensing pins and as the printing mechanism is also well known in the art neither of these two mechanisms will be described herein.

Figure 1:
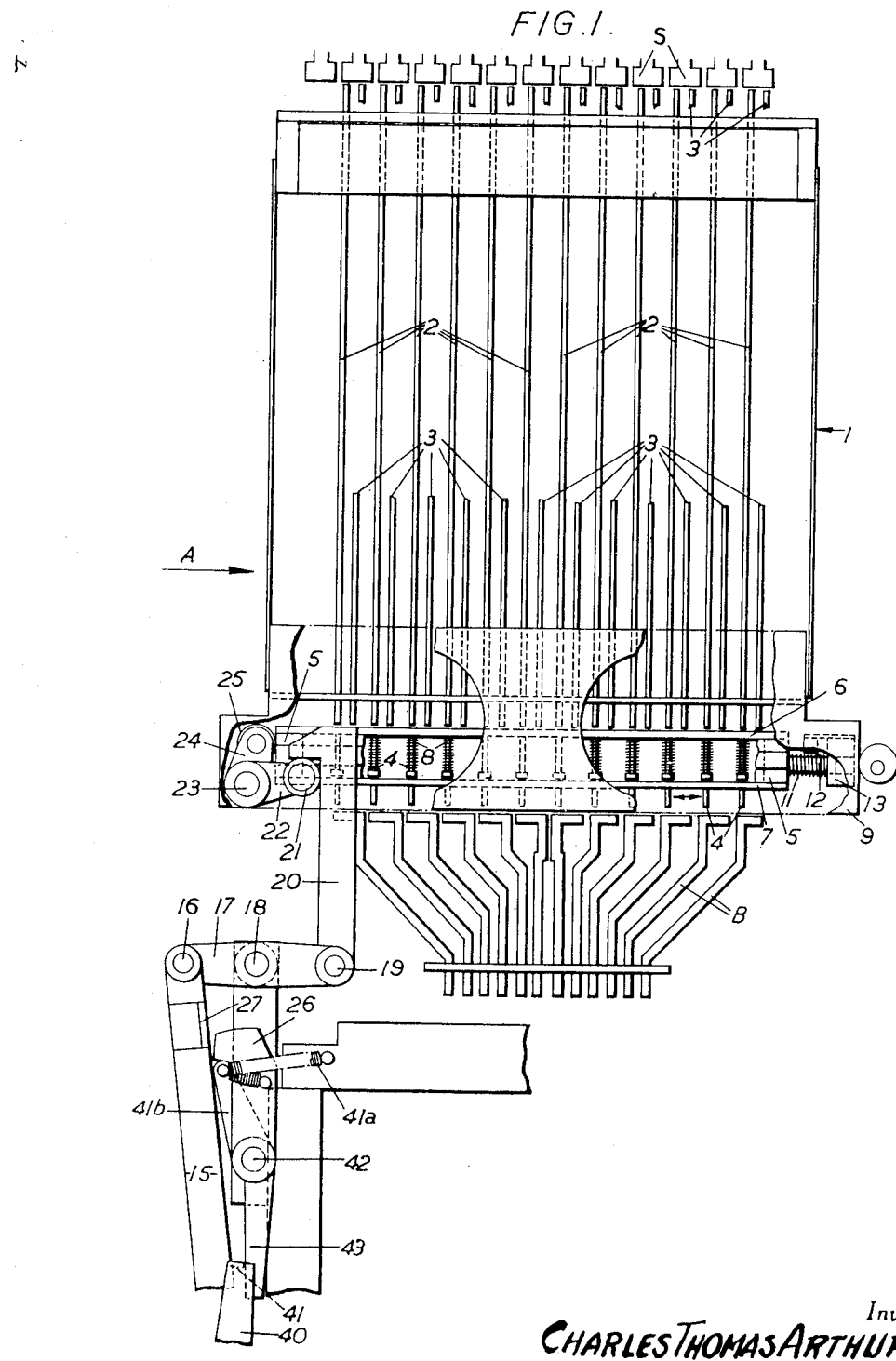
Fig. 1 is an elevation, partly in section and with parts broken away, of one end of apparatus constructed in accordance with the invention.

Referring to the drawings, a duplex connection box 1 is disposed between the printing mechanism and the sensing mechanism and contains a set of straight wires 2 and a set of cross wires 3 which in the drawings are illustrated as rigid wires or rods, but which may, as will be well understood, comprise flexible wiring such as Bowden wires. The wires 2, 3 constitute two sets of transmission elements each of which consists of a plurality of rows of wires of which each row, as shown in Fig. 1, consists of twelve wires, one for each data-indicating position of a vertical column of a card. Each set of wires is to control the recording of data in a different pre-determined manner and, in accordance with the invention, selection means controlled by the record cards is operable selectively to position a set of operating members 4 for co-operation with one or other of the sets of transmission elements 2, 3.

Figure 2:
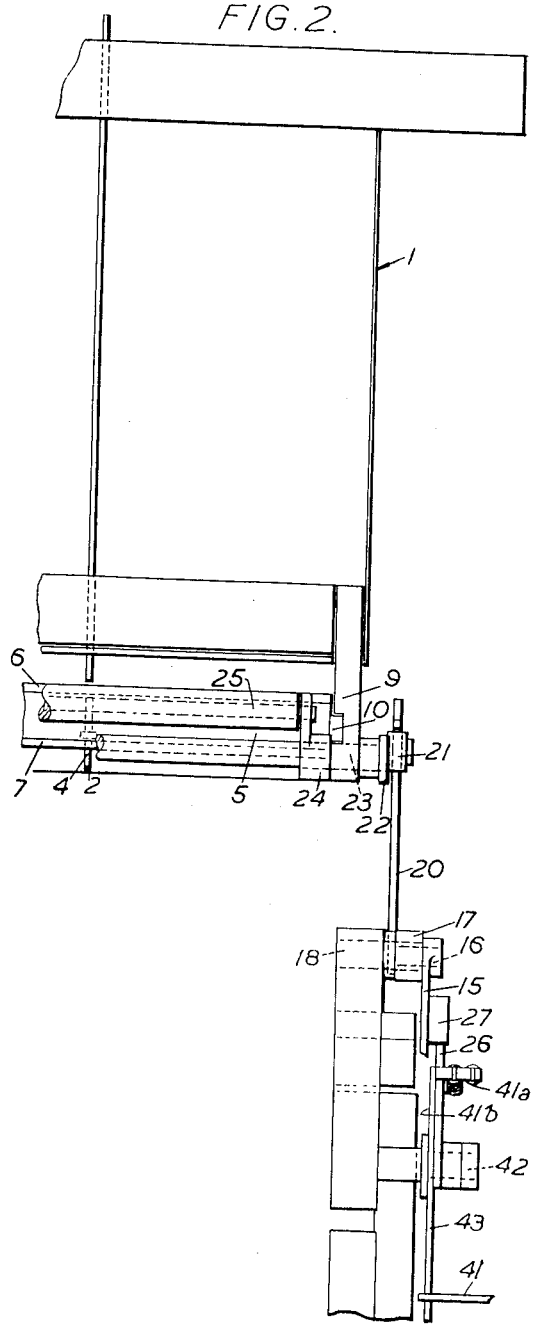
Fig. 2 is an elevation, looking in direction of arrow A, Fig. 1, of a part of the apparatus shown in Fig. 1.

The operating members 4 comprise axially reciprocable pins, one for each transmission element of a set, the pins being supported for axial movement by a frame which consists of a rectangular frame member 5, Figs. 1 and 2, to which is secured an upper plate 6 and a lower plate 7. The pins 4 are movable axially between the plates 6 and 7, and are urged towards the lower plate 7 by springs 8, Fig. 1. The frame supporting the pins 4 is itself supported by fixed supports 9 one at each side of the machine, each support 9, as shown in Fig. 2, being grooved to receive a tongue 10 projecting from a frame member 5 so that the frame is reciprocable as indicated by the double-headed arrow in Fig. 1. In the normal position of the frame the pins 4 are, as shown in Fig. 1, located beneath the straight wires 2 for co-operation therewith and the extent of reciprocation of the frame is such that the pins 4 are moved thereby from the position shown in Fig. 1 to a position at which they are aligned with the cross wires 3 to co-operate therewith.

The frame supporting the pins 4 is urged towards the normal position thereof, as shown in Fig. 1, by springs 11 surrounding pins 12 which extend from a frame member 5 and are slidable in bores formed in a fixed bar 13. A sensing operation is performed once during each revolution of the main shaft 14, Fig. 3, of the machine and movement of the frame against the action of springs 11 is, unless interrupted as described below, effected during each revolution of the main shaft 14 by a cam, not shown, secured to the main shaft 14 and operating a link 15, Figs. 1 and 2, the upper end of which is pivoted at 16 to an arm 17 pivoted at 18 and to which at 19 is pivoted an operating arm 20. The operating arm 20 co-operates with a roller 21 carried by an arm 22 secured to a rocking shaft 23 to which is also secured a rocking arm 24 carrying a roller 25 to engage the frame member 5. During each revolution of main shaft 14, and prior to a sensing operation, the cam moves upwards the link 15 thereby causing operating arm 20 to be pulled downwards thus rocking shaft 23 clockwise, as viewed in Fig. 1, so that the roller 25 on rocking arm 24 moves the frame 5 and pins 4 to the right, as viewed in Fig. 1, from the normal or first position thereof, as shown in Fig. 1, to the second position thereof at which the pins 4 are aligned with the cross wires 3. If a signal from a pre-sensing unit, not shown, has not been received by trip means comprising a latch 26 the springs 11 will restore the frame to the first position thereof so that when the card has travelled from the pre-sensing unit and is located in sensing relation with the sensing means controlling the operation of the pins 4, on sensing of the card the pins 4 will co-operate with the straight wires 2.

As stated above, the sensing means comprises axially movable sensing pins, not shown, and the sensing pins are arranged to effect vertical movement of bars B, Fig. 1, which in turn effect axial movement of pins 4. Axial movement of pins 4 is imparted to the wires 2, 3, as appropriate, and these wires in turn transmit the axial movement to stops S in a stop basket which, in known manner, controls the printing mechanism.

If as the result of the operation of the pre-sensing unit a signal is received by the latch 26, the latch is moved counter-clockwise, as viewed in Fig. 1, and while the link 15 is in the upper position thereof will be positioned beneath an abutment 27 carried by the link thus preventing downward movement of the link. With latch 26 positioned beneath abutment 27 the link 15 is not permitted to move downwards and the pins 4 will be retained in the second position thereof so that they, on operation of the bars B, co-operate with the cross wires 3.

In some circumstances it may be required to retain the pins 4 in the second position thereof for two revolutions of the main shaft 14, that is two successive card sensing operations, or it may be desired to retain them in the second position for three such revolutions or, as in the instances where a four-line name and address is to be sensed from a single card, the pins 4 must be retained in the second position thereof for four successive revolutions of the main shaft 14. It will, therefore, be understood that as the cam for operating link 15 permits restoration of the link during each revolution of the main shaft 14, the latch 26 must be controlled to retain the link in the uppermost position thereof for the required number of revolutions of shaft 14. The mechanism for determining the number of revolutions of main shaft 14 during which the link 15 remains latched in its uppermost position comprises the delay unit shown in Fig. 3.

Figure 3:
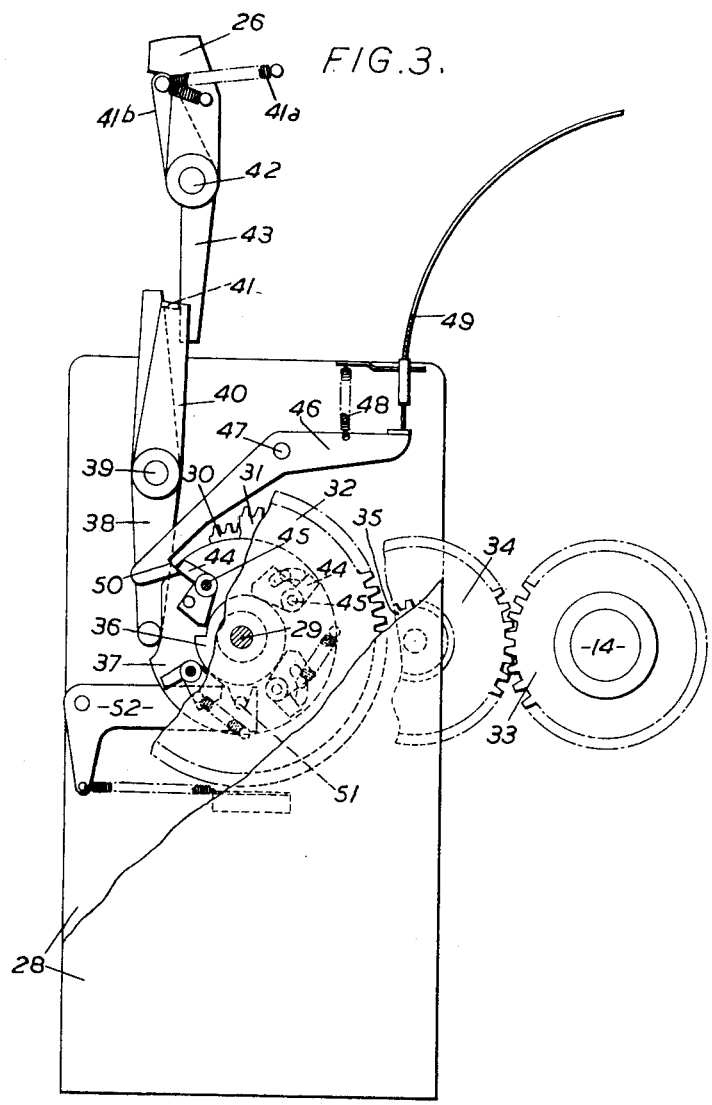
Fig. 3 is a broken elevation illustrating a delay unit used in conjunction with the apparatus shown in Figs. 1 and 2.

Referring to Fig. 3, the delay unit comprises frame members 28 in which is mounted a spindle 29. Supported by the spindle 29 are three gear wheels 30, 31, 32, the gear wheels being spaced apart along the axis of spindle 29 and freely rotatable on the spindle. The gear wheels 30, 31, 32 are continuously rotated by gear wheels 33 secured to shaft 14, connection between the gear wheels 33 and the gear wheels 30, 31, 32 being effected by trains of idler gears 34, 35. The ratio of the gears 30, 31, 32 is such that the angular velocity thereof in relation to the angular velocity of the main shaft 14 is 1:2, 1:3, and 1:4 respectively.

For each of the gear wheels 30, 31, 32 there is provided a clutch dog 36 freely mounted on spindle 29. For clarity, there is shown in Fig. 3 only the clutch dog for gear wheel 32 and the mechanism co-operating with the dog for gear wheel 32. To each clutch dog 36 is secured a trip cam 37 to be angularly movable with the dog, each trip cam co-operating with a trip lever 38 appropriate thereto and pivoted on a spindle 39. Also pivoted on spindle 39 is an arm 40 carrying a trip bar 41 which is movable, against the action of a spring 41a, in a clockwise direction, as viewed in Fig. 3, by the clockwise movement of any one of the three trip levers 38. The latch 26 is freely pivoted on a spindle 42, to which is secured a spring anchor arm 41b, and has a tail 43 engaged by the bar 41. Clockwise movement of the bar 41 effects counter-clockwise movement of the latch 26 to position it beneath the abutment 27 on the link 15 when the link is in the uppermost position thereof.

Each of the gear wheels 30, 31, 32 supports clutch pawls 44 pivoted at 45 for co-operation with the clutch dog 36 appropriate thereto. The clutch pawls 44 are equi-spaced and the number of pawls carried by a gear wheel is equal to the number of times by which the angular velocity of the particular gear wheel is less than that of the main shaft. Thus, as shown in Fig. 3, the gear wheel 32, the ratio of which is 1:4 with respect to the main shaft 14, carries four clutch pawls 44. In the interests of clarity, the pawls for the gears 30 and 31 are not shown, but it will be understood that the gear wheel 31 carries three equi-spaced pawls and the gear wheel 30 carries two equi-spaced pawls.

For each of the gear wheels 30, 31, 32 there is provided a clutch arm 46 freely pivoted on a spindle 47 and controlled by a spring 48 normally to trip the clutch pawls 44 so that they do not operatively engage the clutch dogs 36 as the gear wheels are rotated. Each of the clutch arms 46 is controlled by a Bowden wire 49 individual thereto, the Bowden wires being operable by the above mentioned pre-sensing device so that on the sensing of a control hole in a record card in one of three positions thereon the appropriate one of the Bowden wires 49 will be operated to impart a signal to the delay unit and to move its clutch arm 46 clockwise, as viewed in Fig. 3, about the spindle 47. When a clutch arm 46 is rocked by its Bowden wire 49 the next pawl 44 to approach the trip tooth 50 on the clutch arm is not tripped by the tooth out of the path of its clutch dog and accordingly co-operates therewith to effect rotation of the clutch dog. Rotation of the clutch dog also causes rotation of the trip cam 37 secured thereto thus operating the trip lever 38 co-operating therewith and, through trip bar 41 causes latch 26 to be positioned beneath the abutment 27 on link 15. The trip cam 37 under control of clutch 36, 45 makes one complete revolution and thus, according as to which of the gear wheels 30, 31, 32 is driving, prevents restoration of link 15 for two, three, or four revolutions of shaft 14.

Each of the trip cams 37 is provided with a laterally extending pin 51 which co-operates with a spring controlled detent arm 52 provided to retain the clutch dogs 36 in the correct neutral positions thereof.

I claim:

1. A statistical machine comprising a main shaft to control operation of the machine, control members to control recording of numerical and alphabetic data, a connection box including a set of straight wires and a set of cross wires of which one straight wire and one cross wire co-operate with each control member and the wires of a set are independently operable to effect operation of said control members, each said set consisting of a plurality of rows of wires of which each row consists of one wire for each data-indicating position of a vertical column of a record, operating members equal in number to the wires of a set thereof to effect operation of the wires, and record controlled selection means operative selectively simultaneously to position all said operating members for co-operation with one or other of said sets of wires.

2. A machine according to claim 1, wherein the operating members comprise axially reciprocable pins, supported by a frame slidable in a direction normal to the axes of the pins to position the pins for co-operation with a set of wires, and the selection means includes frame reciprocating means operable prior to a record being presented to the position at which it will control operation of the operating members to effect movement of said frame from a first position thereof at which the pins are positioned for co-operation with one set of wires to a second position at which they are positioned for co-operation with the other set of wires, and record controlled trip means co-operating with said frame reciprocating means temporarily to prevent the restoration of the pins from the second to said first position thereof.

3. A machine according to claim 2, wherein the frame reciprocating means includes a rocking arm to effect movement of the frame from the first to the second position thereof, an operating arm to rock said rocking arm, a link cam operated from said mainshaft to effect operation of the operating arm, and an abutment carried by said link for co-operation with said trip means.

4. A machine according to claim 3, including a delay unit for co-operation with said trip means to determine the number of successive record sensing operations during which the return of the wires to said first position thereof is prevented.

5. A machine according to claim 4, wherein the delay unit includes a trip bar to effect actuation of said trip means, a plurality of trip levers operable independently to effect operation of the trip bar, a trip cam for each said trip lever, a spindle common to said trip cams and about which the cams are freely rotatable, a gear wheel for each said trip cam to effect rotation thereof, each said gear wheel being continuously rotatable about said spindle and arranged to drive its trip cam at a predetermined angular velocity in relation to that of said main shaft and at an angular velocity different from that at which the others of the cams are driven, a clutch device to couple each said gear wheel with the trip cam to be driven thereby, and a clutch arm for each clutch device normally to render the clutch device inactive and operable under record control to render the clutch device active.

6. A machine according to claim 5, wherein each coupling device comprises a clutch dog freely mounted on said spindle, and equi-spaced clutch pawls movable with the gear wheel appropriate thereto, said pawls being in number equal to the number of times by which the angular velocity of the gear wheel is less than that of the main shaft and normally tripped out of co-operation with the clutch dog by the clutch arm appropriate thereto.

References Cited in the file of this patent

UNITED STATES PATENTS

| | | |
|---|---|---|
| 1,780,884 | Lebeis | Nov. 4, 1930 |
| 2,044,121 | Lasker | June 15, 1936 |
| 2,550,079 | Mixer | Apr. 24, 1951 |